United States Patent
Dinu et al.

(10) Patent No.: US 10,481,731 B2
(45) Date of Patent: Nov. 19, 2019

(54) CONCURRENT SENSING IN TOUCH SCREEN CONTROLLER WITH IMPROVED NOISE REJECTION

(71) Applicant: STMicroelectronics Asia Pacific Pte Ltd, Singapore (SG)

(72) Inventors: Leonard Liviu Dinu, Singapore (SG); Hugo Gicquel, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 196 days.

(21) Appl. No.: 15/386,291

(22) Filed: Dec. 21, 2016

(65) Prior Publication Data
US 2018/0173365 A1 Jun. 21, 2018

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ................................ G06F 3/0418; G06F 3/044
See application file for complete search history.

(56) References Cited

U.S. PATENT DOCUMENTS

| | | |
|---|---|---|
| 9,383,395 B1 | 7/2016 | Ogirko et al. |
| 9,898,149 B2 | 2/2018 | Kang et al. |
| 2014/0292375 A1 | 10/2014 | Angelini et al. |
| 2015/0029141 A1 | 1/2015 | Jo et al. |
| 2015/0212643 A1* | 7/2015 | Lee ..................... G06F 3/0416 345/174 |
| 2015/0338952 A1 | 11/2015 | Shahparnia et al. |
| 2016/0070386 A1* | 3/2016 | Yamamoto ............. G06F 3/044 345/174 |

* cited by examiner

*Primary Examiner* — Andrew Sasinowski
(74) *Attorney, Agent, or Firm* — Crowe & Dunlevy

(57) ABSTRACT

Disclosed herein is an electronic device including a sensing layer including a plurality of sense lines, and a plurality of single ended charge converter circuits each receiving input from a corresponding one of the plurality of sense lines. The electronic device also includes a plurality of current mirror circuits, each respectively mirroring output from one of the plurality of single ended charge converter circuits so as to produce two substantially identical outputs for each of the plurality of single ended charge converter circuits. There may be a plurality of subtractor circuits coupled to the plurality of current mirror circuits, with each of the plurality of subtractor circuits configured to output a voltage that is a function of a difference between outputs from two of the plurality of current mirror circuits associated with adjacent ones of the sense lines.

20 Claims, 5 Drawing Sheets

CONCURRENT SENSING IN TOUCH SCREEN CONTROLLER WITH IMPROVED NOISE REJECTION

TECHNICAL FIELD

This disclosure is related to the field of touch screen displays, and more particularly to the rejection of display noise.

BACKGROUND

Handheld electronic devices such as smartphones, tablets, and smartwatches are popular with consumers and are sold in great numbers. The majority of these devices employ a touch sensitive display for both display of output to a user and accepting data as input from a user. Most of these touch sensitive displays utilize capacitive touch sensing.

A typical such touch sensitive display includes a display layer constructed from technology such as LCD, IPS, or AMOLED, as well as a sensing layer. A typical sensing layer includes a plurality of parallel drive lines, and a plurality of parallel sense lines. The sense lines capacitively intersect the drive lines. In operation, a single drive line is driven with a wave, such as a square wave or sine wave. The capacitance between the sense lines and the driven drive line is sensed at the point where they intersect. Presence of a human finger or a conductive object alters the expected capacitance at the intersection point, and by measuring the change in capacitance, a touch between the finger or object and the touch sensitive display can be detected.

Consumer desires for these handheld electronic devices are for the devices to grow increasingly thin. This accordingly results in the desire to make touch sensitive displays increasingly thin. However, as such touch sensitive displays grow thinner, noise from the display layer becomes an increasing problem for the sensing layer, as the thinner designs result in greater parasitic capacitances coupling the noise from the display layer through to the sensing layer. This noise, when coupled through to the sensing layer, degrades accuracy of the touch sensing performed by the sensing layer, which is commercially undesirable.

While methods of reducing the coupling of this noise from the display layer through to the sensing layer are known, and while methods of rejecting the noise that is coupled through are known, those methods may still allow an undesirable amount of display noise to be coupled through to the sensing layer. Therefore, further development is still needed.

SUMMARY

This summary is provided to introduce a selection of concepts that are further described below in the detailed description. This summary is not intended to identify key or essential features of the claimed subject.

Disclosed herein is an electronic device including a sensing layer including a plurality of sense lines, and a plurality of single ended charge converter circuits each receiving input from a corresponding one of the plurality of sense lines. The electronic device also includes a plurality of current mirror circuits, each respectively mirroring output from one of the plurality of single ended charge converter circuits so as to produce two substantially identical outputs for each of the plurality of single ended charge converter circuits.

There may be a plurality of subtractor circuits coupled to the plurality of current mirror circuits, with each of the plurality of subtractor circuits configured to output a voltage that is a function of a difference between outputs from two of the plurality of current mirror circuits associated with adjacent ones of the sense lines.

The plurality of sense lines may include at least first, second, and third sense lines. The plurality of single ended charge converter circuits may include a first single ended charge converter circuit receiving input from the first sense line, a second single ended charge converter circuit receiving input from the second sense line, and a third single ended charge converter circuit receiving input from the third sense line. The plurality of current mirror circuits may include a first current mirror circuit mirroring output from the first single ended charge converter circuit so as to produce first and second substantially identical outputs of the first single ended charge converter circuit, a second current mirror circuit mirroring output from the second single ended charge converter circuit so as to produce first and second substantially identical outputs of the second single ended charge converter circuit, a third current mirror circuit mirroring output from the third single ended charge converter circuit so as to produce first and second substantially identical outputs of the third single ended charge converter circuit.

A first differencing circuit may be configured to determine a difference between the first output of the second single ended charge converter circuit and the second output of the first single ended differential charge converter circuit, and a second differencing circuit may be configured to determine a difference between the first output of the third single ended charge converter circuit and the second output of the second single ended differential charge converter circuit.

Also disclosed herein is a method aspect. The method includes, for each of a plurality of sense lines, converting charge on that sense line to a single current corresponding to the charge. The method also includes duplicating the single current corresponding to the charge, for each of the plurality of sense lines, so as to produce two output currents for each of the plurality of sense lines.

Differences between output currents for adjacent sense lines may be determined, and may be converted to voltages.

The charge on each of the plurality of sense lines may be converted to a single current for that sense line using a single ended charge converter circuit for that sense line. Each single ended charge converter circuit may be coupled to its corresponding sense line and a voltage reference during a reset period, and each single ended charge converter circuit may be coupled to its corresponding sense line and not to a voltage reference during a scan period.

Display noise is capacitively coupled from a display layer to each of the plurality of sense lines, and is rejected during the scan period by capacitively coupling the display noise to gates and sources of transistors of single ended charge converter circuits.

The differential single ended charge converters used herein may include an input stage that has a first NMOS transistor having a gate, and a source to be coupled to a sense line, a first capacitive coupling between the gate of the first NMOS transistor and the source of the first NMOS transistor such that a transient component of noise received from the sense line is applied to both the gate and the source of the first NMOS transistor, a first PMOS transistor with a gate and a source to be coupled to the sense line, and a second capacitive coupling between the gate of the first PMOS transistor and the source of the first PMOS transistor such that the transient component of the noise is applied to both the gate and the source of the first PMOS transistor. The differential single ended charger converter may also include a converter circuit to be coupled to the sense line.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
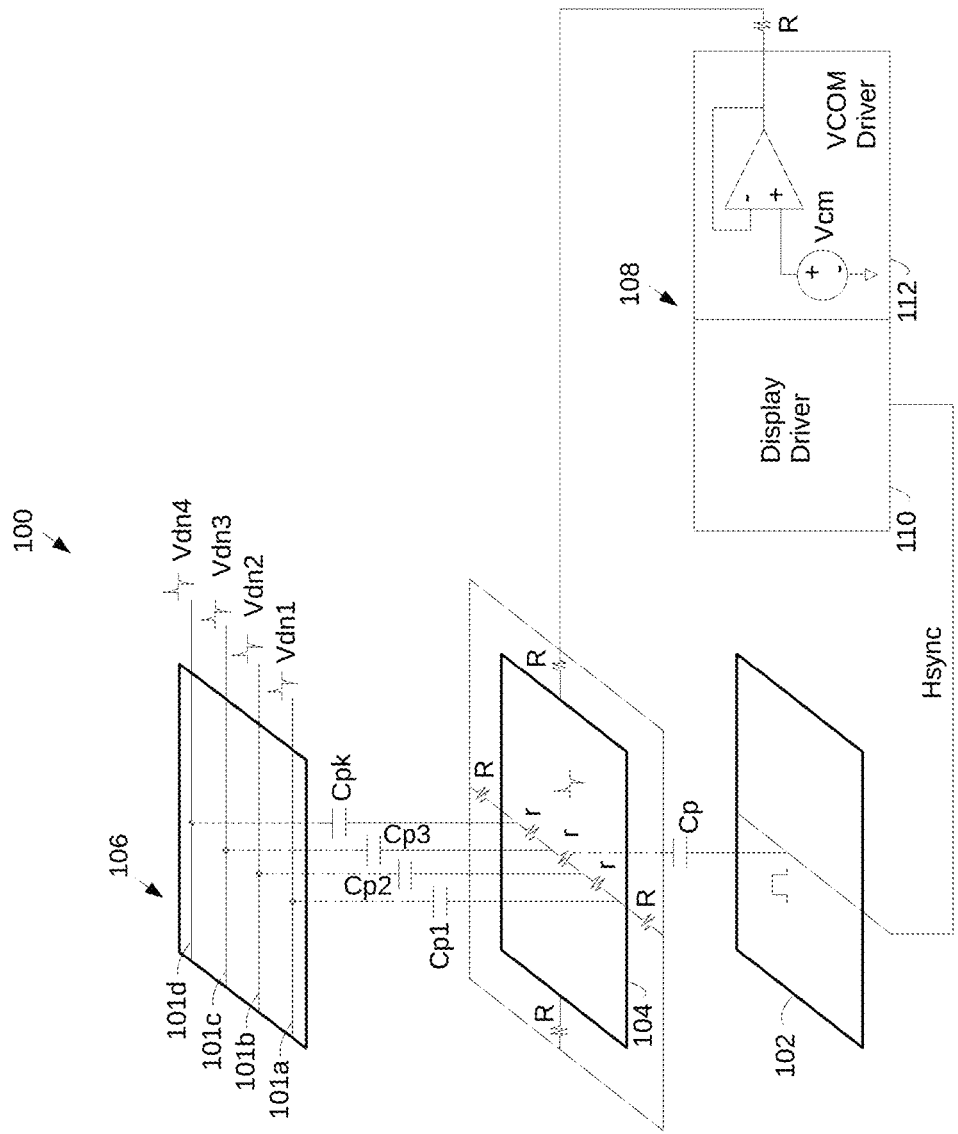
FIG. 1 is schematic block diagram of touch screen in which display noise is coupled through to a plurality of sense lines.

With initial reference to FIG. 1 a touch sensitive display 100 for an electronic device is now described. The electronic device may be a smartphone, smartwatch, tablet, laptop, or other suitable portable electronic device. The touch sensitive display 100 includes a display layer 102 with a common voltage layer (VCOM) 104 thereon. A touch sensing layer 106 is over the VCOM layer 104.

Figure 2:
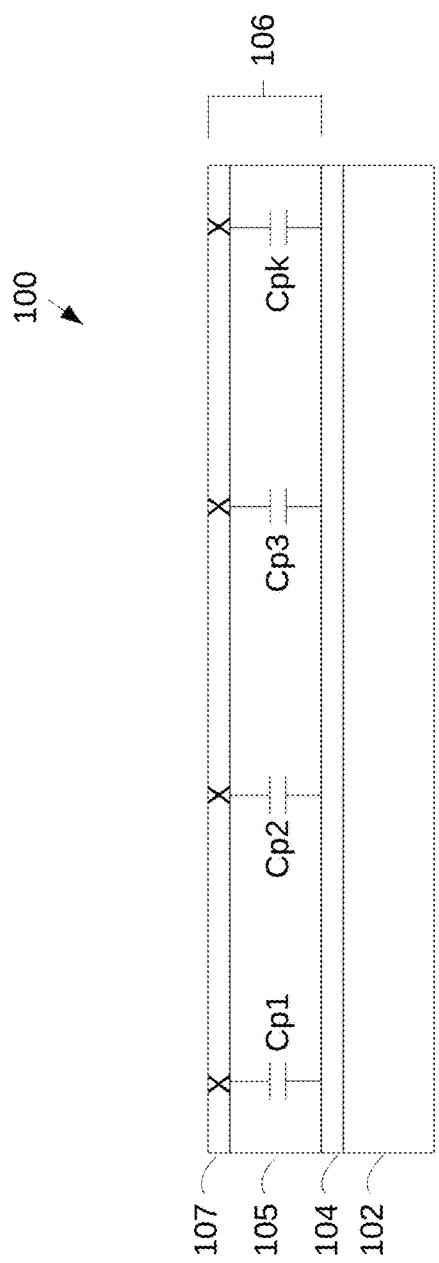
FIG. 2 is a schematic cross sectional diagram of the touch screen of FIG. 1 showing the arrangement of the display layer, VCOM layer, and sensing layer, as well as the parasitic capacitances coupling the display noise to the sensing layer.

As best shown in FIG. 2, the touch sensing layer 106 is comprised of a substrate 105 having a touch sensor 107 formed thereon. The touch sensor 107 itself is formed by capacitively intersecting sense lines 101a-101d and a drive line 109. Although four sense lines 101a-101d are shown, there may be any number of such sense lines. Although one drive line 109 is shown, there may be any number of such drive lines.

A touch is detected via measuring the capacitance between the sense lines 101a-101d and the drive line 109. The VCOM layer 104 provides a common voltage for both the sensing layer 106 and the display layer 102. The VCOM layer 104 is supplied at multiple points about its perimeter, illustrated in FIG. 1. The common voltage is based upon a voltage reference Vcom.

Due to this VCOM layer 104, as will be explained in detail below, parasitic capacitances Cp1-Cp4 are formed between the sensing layer 106 and the VCOM layer 104, and a parasitic capacitance Cp is formed between the VCOM layer 104 and the display layer 102. For simplicity, four parasitic capacitances Cp1-Cp4 are shown, but it should be understood that there may be any number of parasitic capacitances formed between the sensing layer 106 and the VCOM layer 104, and between the VCOM layer 104 and the display layer 102.

The display layer 102 contains rows and columns of pixels that are scanned so as to form an image for display to a user. The display layer 102 is coupled to a display driver 110 which controls the display layer 102 using a horizontal sync signal HSYNC, which is a pulse that synchronizes the start of scanning of a row.

In operation, the drive line 109 is driven with a periodic signal, such as a square wave. At the intersection point between the drive line 109 and sense lines 101a-101d, the sense lines 101a-101d incur a charge injection proportional to the voltage at the drive line 109 and a capacitance between the sense lines 101a-101d and the drive line 109 at that intersection point. This capacitance varies in proximity to conductive objects, such as human fingers, and is measured and processed by a touch screen controller (TSC) 150 so as to generate touch data for use by the electronic device.

Figure 3:
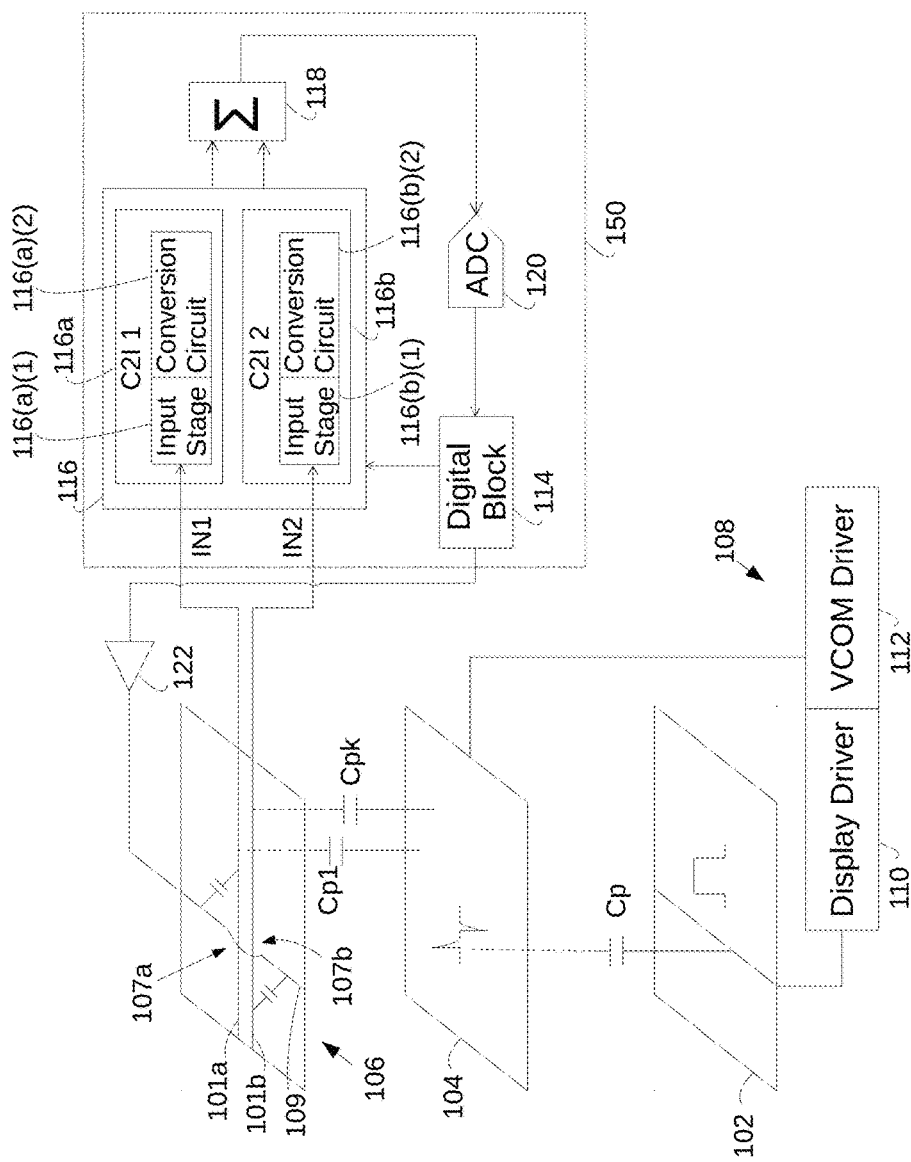
FIG. 3 is a schematic block diagram of the touch screen of FIG. 1, incorporating noise rejection in two of the sense lines in accordance with this disclosure.

Greater detail of the TSC 150 with reference to its operation on two sense lines 101a, 101b and the drive line 109 will now be given with reference to FIG. 3. The touch screen controller 150 includes a driver 122 coupled to the drive line 109 and controlled by a drive (or "force") signal Tx from the digital block 114. The sense line 101a is coupled to charge to current converter circuits 116a, 116b (collectively indicated as C2I 116). The C2I 116 is coupled to an accumulator 118, which in turn is coupled to an analog to digital converter (ADC) 120, which is coupled to the digital block 114.

Generation of the touch data will now be described. The drive line 109 is driven with a periodic signal by the driver 122, under control of the digital block 114. At the intersection point between the drive line 109 and sense line 101a, as well as sense line 101b, the sense lines 101a, 101b incur a charge injection proportional to the voltage at the drive line 109 and a capacitance between the sense lines 101a, 101b and the drive line 109 at that intersection point. The C2I 116 converts the signals on the sense lines 101a-101b to currents, and the accumulator 118 integrates the difference of the currents to produce differential voltage outputs and sums these voltages over time.

The analog to digital converter 120 converts the sum to the digital domain and passes it to the digital block 114. The digital block 114 processes the sum to produce touch data, which it outputs.

The inventors have found that, at each HSYNC pulse, noise is capacitively coupled from the display layer 102 into the VCOM layer 104 via the parasitic capacitance Cp. Then, that noise is capacitively coupled from the VCOM layer 104 into the sensing layer 106 via the parasitic capacitances Cp1-Cp4. This noise causes unwanted charge injection which would degrade the accuracy and performance of the touch data generated by the touch screen controller 150.

In greater detail, the VCOM layer 104 is a reference plane. It is driven by a VCOM driver 112 through wires having a routing resistance R, at multiple connection points. Although four connection points are shown, other numbers of connection points may be used. The result of the VCOM layer 104 being driven at different connection points is that the amplitude of the display noise seen on the VCOM layer 104 is dependent on the position on the VCOM layer 104 at which the display noise is measured. Near the connection points, the amplitude of the display noise in the VCOM layer is less than far from the connection points.

It follows then that the amplitude of the display noise coupled through from the VCOM layer 104 to each sense lines 101a-101d depends on the location of each sense line relative to the connection points of the VCOM layer 104. Thus, each sense line 101a-101d may be subject to display noise of a different amplitude due to the location of that sense line relative to the connection points of the VCOM layer 104. Adding to this is the fact that the parasitic capacitances Cp1-Cp4 that couple the display noise from the VCOM layer 104 to the sense lines 101a-101d are not equal in value. Thus, the amplitude of the display noise experienced at the different sense lines 101a-101d may differ between 0% to 15%.

Fully differential sensing techniques may be used to reject at least some of this display noise. However, due to the common mode nature of the display noise at sense lines 101a-101d, a robust common mode rejection circuit is desired. In addition, fully differential sensing techniques involve multiplexing the sensing. This not only increases power consumption, but also increases acquisition time.

Therefore, the individual charge to current converter circuits 116a, 116b within the C2I 116 incorporate circuitry and techniques to reject display noise, while avoiding the drawbacks of differential sensing. It should be appreciated that any number of charge to current converter circuits 116a, 116b may be within the C2I 116.

The charge to current converter circuit 116a includes an input stage 116(a)(1) and a conversion circuit 116(a)(2). Similarly, the charge to current converter circuit 116b includes an input stage 116(b)(1) and a conversion circuit 116(b)(2). The input stages 116(a)(1) and 116(b)(1) serve to cancel out display noise, such that the display noise is attenuated or not present in the signals converted by the conversion circuits 116(a)(2) and 116(b)(2).

Figure 4:
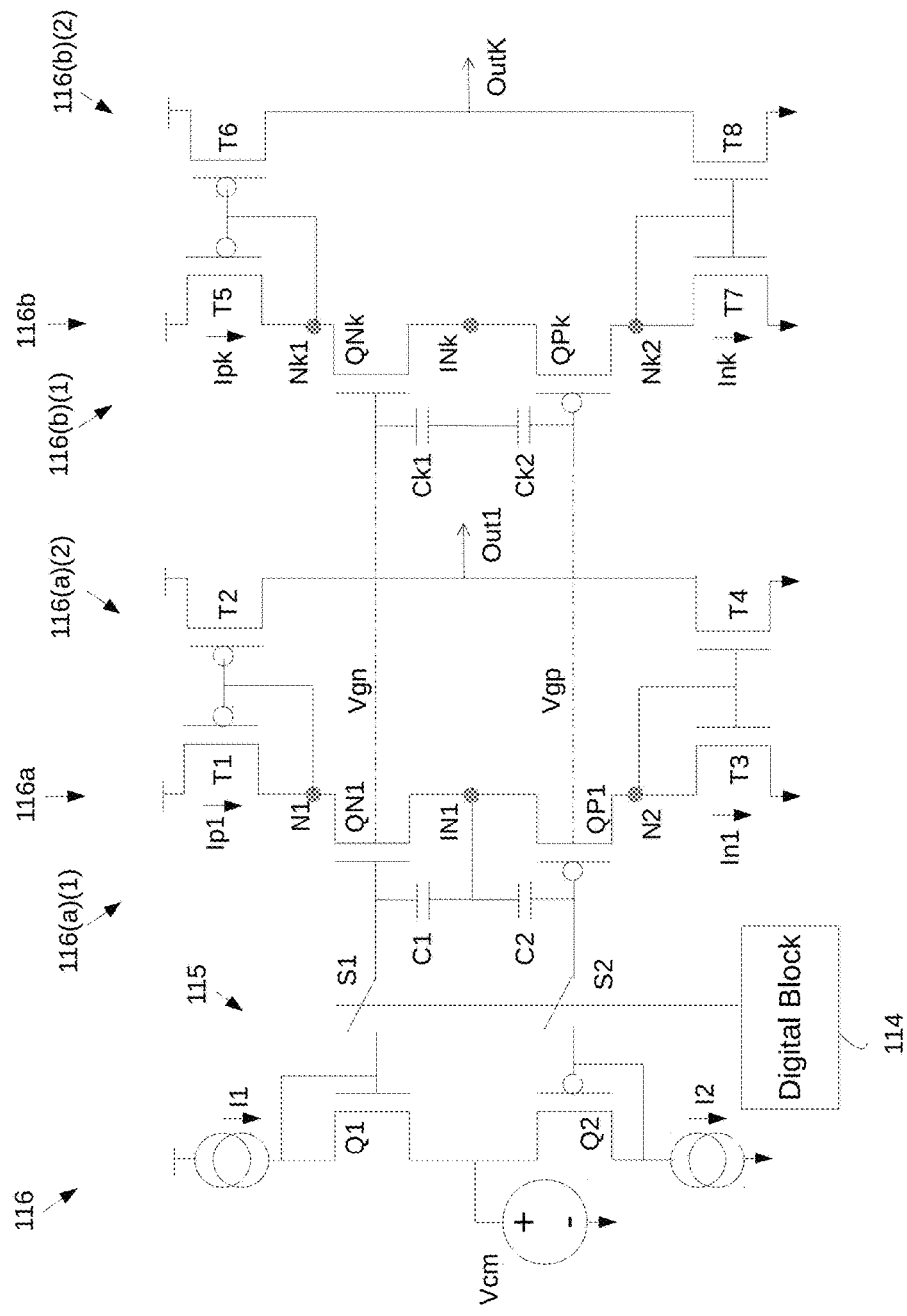
FIG. 4 is a detailed schematic diagram of input stages of the charge to current converters of FIG. 3.

Details of the individual charge to current converter circuits 116a, 116b will now be given below with reference to FIG. 4. Common to each of the charge to current converter circuits 116a, 116b within the C2I 116 is a reference voltage generation circuit 115. The reference voltage generation circuit 115 includes first diode coupled transistor Q1 having its drain coupled to current source I1, its source coupled to the voltage reference Vcm, and its gate coupled to switch S1. The gate of transistor Q1 is also coupled to the drain of transistor Q1. The reference voltage generation circuit 115 also includes a second diode coupled transistor Q2 having its source coupled to the voltage reference Vcm, its drain coupled to current source I2, and its gate coupled to switch S2. The gate of transistor Q2 is also coupled to the drain of transistor Q2.

The input stage 116(a)(1) of the charge to current converter circuit 116a includes a first NMOS transistor QN1 having its drain coupled to node N1, its source coupled to a first input IN1, and its gate coupled to switch S1. The charge to current converter circuit 116a includes a first PMOS transistor QP1 having its source coupled to the first input IN1, its drain coupled to, node N2 and its gate coupled to switch S2. Capacitor C1 is coupled between the gate and source of the first NMOS transistor QN1, and capacitor C2 is coupled between the gate and source of the first PMOS transistor QP1.

The charge to current converter circuit 116a includes PMOS transistor T1 having its source coupled to the power supply node, its drain coupled to node N1, and a gate. PMOS transistor T2 is coupled in a current mirror relationship with PMOS transistor T1. The charge to current converter circuit 116a also includes NMOS transistor T3 having drain coupled to node N2, its source coupled to ground, and a gate. NMOS transistor T4 is coupled in a current mirror relationship with NMOS transistor T3. The drain of PMOS transistor T2 and drain of NMOS transistor T4 are coupled together.

The input stage 116(b)(1) of the charge to current converter circuit 116b includes a second NMOS transistor QNk having its drain coupled to node Nk1, its source coupled to a second input INk, and its gate coupled to switch S1. The charge to current converter circuit 116b includes a second PMOS transistor QPk having its source coupled to the second input INk, its drain coupled to node Nk2, and its gate coupled to switch S2. Capacitor Ck1 is coupled between the gate and source of the second NMOS transistor QNk, and capacitor Ck2 is coupled between the gate and source of the seccond PMOS transistor QPk.

The charge to current converter circuit 116b includes PMOS transistor T5 having its source coupled to the power supply node, its drain coupled to node Nk1, and a gate. PMOS transistor T6 is coupled in a current mirror relationship with PMOS transistor T5. The charge to current converter circuit 116b also includes NMOS transistor T7 having drain coupled to node Nk2, its source coupled to ground, and a gate. NMOS transistor T8 is coupled in a current mirror relationship with NMOS transistor T7. The drain of PMOS transistor T6 and drain of NMOS transistor T8 are coupled together.

The digital block 114, described above, controls switches S1 and S2. In particular, during a reset period, the digital block 114 closes switches S1 and S2. The closing of the switches S1, S2 serves to bias the gates of QN1, QP1, QNk, and QPk such that their sources are equal to Vcm, and the currents Ip1, In1 are mirrors of currents I1 and I2, and such that the currents Ipk, and Ink are also mirrors of currents I1 and I2.

In a scanning period the digital block 114 opens switches S1 and S2. This opening of switches S1 and S2 serves to decouple the gates and sources of transistors QN1, QP1, QNk, and QPk from the gate voltage references. Thus, the gates to the transistors QN1, QP1, QNk, and QPk float during the scanning period. The means that common mode noise at IN1 and Ink will shift both the gates and sources of the transistors QN1, QP1, QNk, and QPk, and thus the currents Ip1, In1, Ipk, and Ink would be unchanged. The common mode noise through the voltage reference Vcm is therefore fully rejected In greater detail, during the reset period, the operation of the switches S1 and S2 fixes the gate to source voltages of the transistors QN1, QP2, QNk, and QPk, and transistors C1, C2 and Ck1, Ck2 serve to store these voltages. In turn, this fixes currents Ip1 and In1 respectively flowing through transistors QN1 and QP1, and currents Ipk and Ink respectively flowing through transistors QNk and QPk. After the reset, switches S1 and S2 are opened. Since the capacitors C1 and C2 have stored the gate to source voltages of QN1 and QP1, and since Ck1 and Ck2 have stored the gate to source voltages of QNk and QPk, biasing is conserved. Therefore, the currents Ip1, In1, Ipk, Ink remain unchanged after the switches S1 and S2 are opened.

During the scanning period, if there is a differential voltage between input IN1 and another Ink and current is to be supplied to Cp1, then Ip1 increases by $\Delta Ip1$, and In1 decreases by $\Delta In1$. The difference between (Ip1+$\Delta Ip1$) and (In1−$\Delta In1$) flows into CP1 and is amplified and mirrored as the output current Out1 by the current mirrors formed by transistors T1, T2 and T3, T4.

If differential voltage at the inputs IN1 and Ink, or between any two inputs, results in current to be supplied to CPk, then Ipk increases by $\Delta Ipk$, and Ink decreases by $\Delta Ink$. The difference between (Ipk+$\Delta Ipk$) and (Ink−$\Delta Ink$) flows into CPk, is and is amplified and mirrored as the output current Out2 by the current mirrors formed by transistors T5, T6 and T7, T8.

Display noise received at the inputs IN1 and INk, or between any two inputs, is time varying through Cp1-Cpk, and is therefore coupled through to the gates of QN1, QP1, QNk, and QPk through capacitors C1, C2, Ck1, Ck2. Thus, the display noise Vdn1 from sense line 101a is fed to both the gates and sources of those transistors, and consequently the gate to source voltages do not change due to the common mode noise within the display noise Vdn1, and instead changes due to a differential voltage between inputs IN1 and INk. Likewise, the display noise Vdn2 from sense line 101b is fed to both the gates and sources of those transistors, and consequently the gate to source voltages do not change due to the common mode noise within the display noise Vdn2, and instead changes due to a differential voltage between inputs.

As denoted by the labels "k" in the charge to current converter circuit 116b, there may be any number of charge to current converter circuits so as to match the number of sense lines present.

Although charge to current converter circuit 116a, 116b are described, any charge converter circuits may be used, such as charge to voltage converter circuits.

Figure 5:
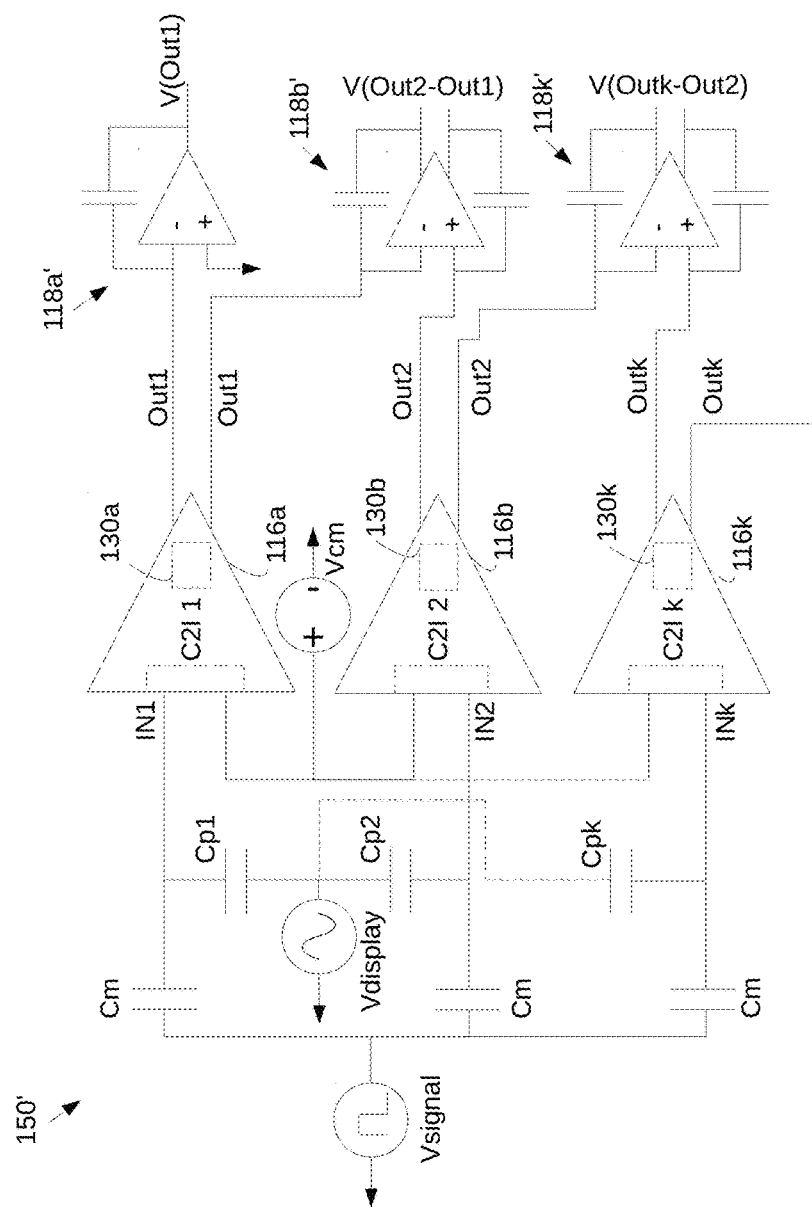
FIG. 5 is a schematic block diagram of an arrangement of charge to current converters disclosed herein.

A more generalized embodiment of the touch screen controller 150', illustrating the single ended nature and the way that this design allows the obtainment of the touch data signals in one time period and without multiplexing, is now described with reference to FIG. 5.

Here, as shown, there are three charge to current converters 116a, 116b, 116k, with "k" being used to represent the fact that there may be any number of charge to current converters. These charge to current converters 116a, 116b, 116k are as described above. Each charge to current converter 116a, 116b, 116k is coupled to a respective sense line and receives a capacitance signal therefrom, as represented by the capacitors Cm. Parasitic capacitances Cp1, Cp2, Cpk couple display noise into the first inputs IN1, IN2, INk of the charge to current converters 116a, 116b, 116k.

The charge to current converters 116a, 116b, 116k are single ended, and reject the display noise as described above. The charge to current converters 116a, 116b, 116k convert the received capacitance signals to currents. The output current from each charge to current converter 116a, 116b, 116k is mirrored by respective current mirrors 130a, 130b, 130k so as to produce two identical, substantially identical, or substantially similar currents for each charge to current converter 116a, 116b, 116k. For example, the currents Out1 are produced by the C2I 116a, the currents Out2 are produced by the C2I 116b, and the currents Outk are produced by the C2I 116b.

Subtractor circuits 118b', 118k' serve to determine the difference in the currents for adjacent sense lines and convert that difference to voltages V(Out2-Out1), V(Outk-Out2), while amplifier circuit 118a' converts the current Out1 to a voltage V(Out1). The subtractor circuits 118b', 118k' as shown are differential integrators, but other designs may be used instead.

The mirroring by the current mirrors 130a, 130b, 130k enables the determination of the differences between the output currents produced by the charge to current converters 116a, 116b, 116k for adjacent sense lines without multiplexing, and are therefore acquired in one sensing time slot.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:
1. An electronic device, comprising:
a plurality of single ended charge converter circuits each receiving input from a corresponding one of a plurality of sense lines of a sensing layer; and
a plurality of current mirror circuits, each respectively mirroring output from one of the plurality of single ended charge converter circuits so as to produce two substantially identical outputs for each of the plurality of single ended charge converter circuits.
2. The electronic device of claim 1, further comprising a plurality of subtractor circuits coupled to the plurality of current mirror circuits, each of the plurality of subtractor circuits configured to output a voltage that is a function of a difference between outputs from two of the plurality of current mirror circuits receiving input from adjacent ones of the sense lines.
3. The electronic device of claim 1, wherein the plurality of sense lines include at least first, second, and third sense lines; wherein the plurality of single ended charge converter circuits comprise a first single ended charge converter circuit receiving input from the first sense line, a second single ended charge converter circuit receiving input from the second sense line, and a third single ended charge converter circuit receiving input from the third sense line; and wherein the plurality of current mirror circuits comprises a first current mirror circuit mirroring output from the first single ended charge converter circuit so as to produce first and second substantially identical outputs of the first single ended charge converter circuit, a second current mirror circuit mirroring output from the second single ended charge converter circuit so as to produce first and second substantially identical outputs of the second single ended charge converter circuit, a third current mirror circuit mirroring output from the third single ended charge converter circuit so as to produce first and second substantially identical outputs of the third single ended charge converter circuit.
4. The electronic device of claim 3, further comprising a first differencing circuit configured to determine a difference between the first output of the second single ended charge converter circuit and the second output of the first single ended charge converter circuit, and a second differencing circuit configured to determine a difference between the first output of the third single ended charge converter circuit and the second output of the second single ended charge converter circuit.
5. The electronic device of claim 1, wherein each of the plurality of single ended charge converter circuits has a first input coupled to a corresponding one of the plurality of sense lines and a second input that is coupled to a voltage reference during a reset period and is decoupled from the voltage reference during a scan period.
6. The electronic device of claim 5, wherein the first input of each of the plurality of single ended charge converter circuits is capacitively coupled to a second input of that single ended charge converter circuit; further comprising a display layer generating display noise based on scanning thereof; wherein the display noise is capacitively coupled from the display layer to each of the plurality of sense lines of the sensing layer; and wherein the display noise is rejected due to the first input of each of the plurality of single ended charge converter circuits being capacitively coupled to the second input of that single ended charge converter circuit.
7. The electronic device of claim 6, further comprising a common voltage layer coupled to the display layer and the sensing layer, the common voltage layer capacitively coupling the display noise from the display layer to each of the plurality of sense lines of the sensing layer.

8. The electronic device of claim 1, wherein at least one of the plurality of single ended charge converter circuits comprises an input stage, the input stage including:
- at least one first transistor having a conduction terminal serving as a first input and a control terminal serving as a second input;
- a first capacitor coupling the control terminal to the conduction terminal; and
- a switch selectively coupling a voltage reference to the control terminal as a function of a reset period and a scan period.

9. The electronic device of claim 8, wherein the input stage of at least one of the plurality of single ended charge converter circuits further comprises:
- at least one second transistor having a first conduction terminal coupled to receive the voltage reference, a second conduction terminal coupled to a current source, and a control terminal coupled to the control terminal of the at least one first transistor through the switch; and
- a second capacitor coupling the first conduction terminal of the at least one second transistor to the control terminal of the at least one second transistor.

10. The electronic device of claim 1, further comprising:
- a first NMOS transistor having a drain coupled to a first node, a source coupled to a first input, and a gate;
- a first PMOS transistor having a source coupled to the first input, a drain coupled to a second node, and a gate;
- wherein each of the plurality of single ended charge converter circuits comprises an input stage, the input stage including:
  - a first capacitive coupling between the gate of the first NMOS transistor and the source of the first NMOS transistor; and
  - a second capacitive coupling between the gate of the first PMOS transistor and the source of the first PMOS transistor.

11. The electronic device of claim 10, wherein the first capacitive coupling comprises a first capacitor coupled between the gate of the first NMOS transistor and the source of the first NMOS transistor; and wherein the second capacitive coupling comprises a second capacitor coupled between the gate of the first PMOS transistor and the source of the first PMOS transistor.

12. The electronic device of claim 10, further comprising:
- a first switch selectively coupling a voltage reference to the gate of the first NMOS transistor as a function of a reset period and a scan period; and
- a second switch selectively coupling the voltage reference to the gate of the first PMOS transistor as a function of the reset period and the scan period.

13. The electronic device of claim 12, further comprising a control circuit configured to control the first and second switches.

14. The electronic device of claim 12, wherein the input stage of each of the plurality of single ended charge converter circuits further comprises:
- a second NMOS transistor having a drain coupled to a first current source, a source coupled to receive the voltage reference, and a gate coupled to the gate of the first NMOS transistor through the first switch; and
- a second PMOS transistor having a source coupled to the source of the second NMOS transistor, a drain coupled to a second current source, and a gate coupled to the gate of the first PMOS transistor through the second switch.

15. A method, comprising:
- for each of a plurality of sense lines of a sensing layer, converting charge on that sense line to a single current corresponding to the charge; and
- duplicating the single current corresponding to the charge, for each of the plurality of sense lines, so as to produce two output currents for each of the plurality of sense lines.

16. The method of claim 15, further comprising determining differences between output currents for adjacent sense lines.

17. The method of claim 16, further comprising converting the differences to output voltages.

18. The method of claim 15, wherein the charge on each of the plurality of sense lines is converted to a single current for that sense line using a single ended charge converter circuit for that sense line; further comprising coupling each single ended charge converter circuit to its corresponding sense line and a voltage reference during a reset period, and coupling each single ended charge converter circuit to its corresponding sense line and not to a voltage reference during a scan period.

19. The method of claim 18, wherein display noise from a display layer is capacitively coupled to each of the plurality of sense lines, the method further comprising rejecting the display noise during the scan period by capacitively coupling the display noise to gates and sources of transistors of single ended charge converter circuits.

20. The method of claim 19, wherein coupling the single ended charge converter circuits to the voltage reference during the reset period comprises closing switches coupling the plurality of sense lines to the single ended charge converter circuits during the reset period; and
- wherein not coupling the single ended charge converter circuits to the voltage reference during the scan period comprises opening the switches during the scan period.

* * * * *